Dec. 20, 1960 J. J. BLASINGAME ET AL 2,965,895
TWO ANTENNA AIRBORNE MOVING TARGET SEARCH RADAR
Filed May 22, 1951 3 Sheets-Sheet 1

INVENTORS:
RALPH OVERHOLT JR.
JESSE J. BLASINGAME
BY
ATTORNEYS

Dec. 20, 1960     J. J. BLASINGAME ET AL     2,965,895
TWO ANTENNA AIRBORNE MOVING TARGET SEARCH RADAR
Filed May 22, 1951     3 Sheets-Sheet 2
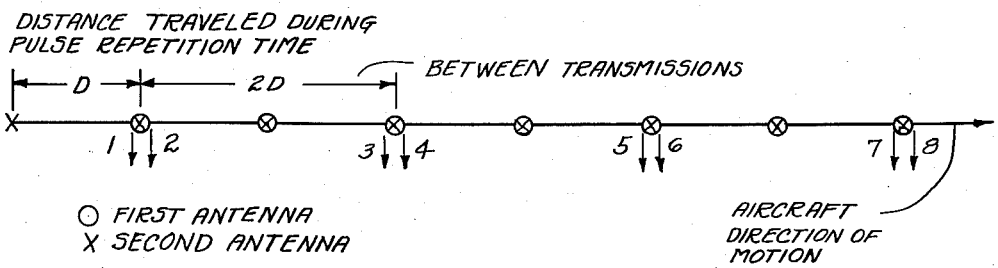
Fig. 3.
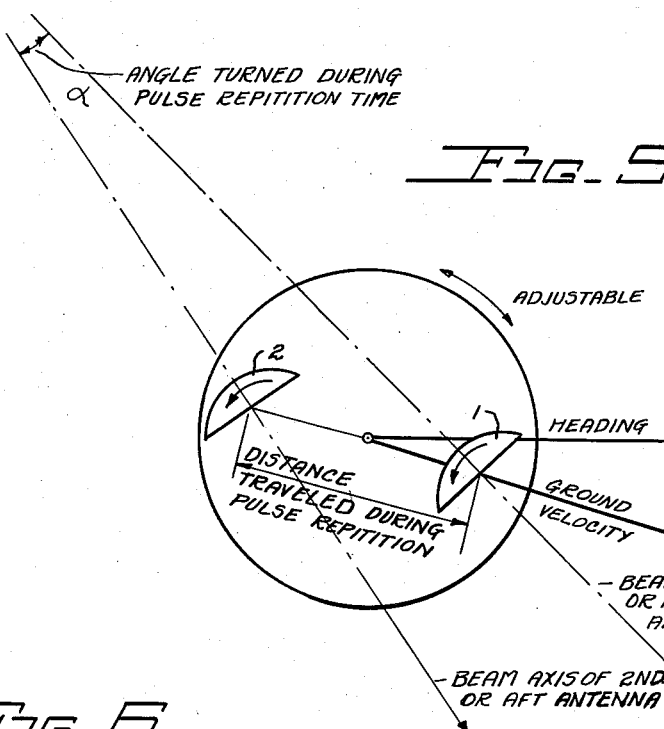
Fig. 5.
Fig. 6.
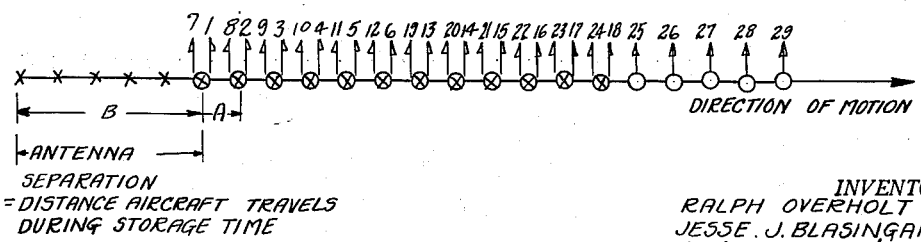
INVENTORS.
RALPH OVERHOLT JR.
JESSE J. BLASINGAME
BY
ATTORNEYS

INVENTORS.
RALPH OVERHOLT JR.
JESSE J. BLASINGAME
BY
ATTORNEYS

United States Patent Office 2,965,895
Patented Dec. 20, 1960

2,965,895

TWO ANTENNA AIRBORNE MOVING TARGET SEARCH RADAR

Jesse J. Blasingame, 337 N. Elm St., Fairborn, Ohio, and Ralph Overholt, Jr., 2621 E. 3rd St., Dayton, Ohio Filed May 22, 1951, Ser. No. 227,588

2 Claims. (Cl. 343—7.7)

(Granted under Title 35, U.S. Code (1952), sec. 266)

The invention described herein may be manufactured and used by or for the Government for governmental purposes without payment to us of any royalty thereon.

This invention relates to an improved radar transmitting from a moving antenna simulating transmissions from a point fixed in space with an illustrative application to a moving target indication system.

In the past, airbourne radar commonly has been characterized by each pulse being transmitted from a different point in space. Under these circumstances, echoes from a combined target are characterized by objectionable fluctuations in their presentation. The fluctuations are influenced by the rate of flight, the altitude of the aircraft and by its distance and direction from the target. The fluctuations are influenced further by the radar pulse length, the scanning rate, the pulse repetition rate, the frequency of transmission and by the beam width of the antenna from which the pulses are radiated into space. Fluctuations appear in the radar presentation as amplitude variations from pulse to pulse due to the variations in the vector addition of reflections. The fluctuating power ratio has been estimated to an amount of from 7 to 45 decibels. The fluctuation ratio here used is the ratio of the power in the reflected pulse to the power difference between two succeeding pulses.

Two main obstacles have been apparent in the development of airbourne moving target radar which uses the Doppler effect for the detection of moving targets. One obstacle is undesirable blind speeds and the other obstacle is fluctuations in the ground clutter which may be confused with indications from a moving target. The ground clutter fluctuations is the more objectionable effect since moving target signals may be entirely obscured by it. The blind speed effect sets a probability factor for seeing the target which depends upon the signal strength and the speed of the target. The blind speed effect is a target speed at which the target appears to be at rest on a radar presentation because it travels away or toward the radar one-half wave length distance or multiple thereof between pulses.

The present invention provides an improved airbourne radar transmitting from a simulated fixed platform in space. The present invention provides further an improved moving target search radar. The moving target search radar here disclosed is directed particularly to the detection of moving targets in the background of ground clutter. The simulation of a radar transmitting from a fixed point in space is accomplished by causing the transmission of alternate pulses from two antennas so located on the aircraft that one is forward of the other in the direction of flight. The antennas are separated by a distance equal to that through which the airplane moves in one pulse repetition time. The first transmission is made from the forward antenna and the second transmission is made from the aft antenna when the aft antenna is in the position of the forward antenna so that the two transmissions are made from the same point in space and under similar conditions. The echoes from the two transmissions are compared in a storage system where echoes from fixed objects are cancelled and echoes from moving objects are amplified and presented on a plan position indicator cathode ray tube.

The objects of the present invention are to provide an improved airbourne radar equipment particularly adapted for detection of the direction of the ground track and of the ground speed of the airplane. As a further application of the present invention, this system provides for the detection of moving ground targets in the background of ground clutter. All of the described features are available without impairing the normal search radar functions of the apparatus. In the separation of the moving targets from the fixed targets the radial velocities of the moving targets may vary from a few miles per hour up to and beyond 60 miles per hour. The ranges at which these targets may be detected are up to 15 miles or more for large tanks and trucks and up to approximately 10 miles for smaller vehicles. The moving target indication performance of this system is independent of the speed of the airplane carrying the equipment used in the practice of the present invention.

An illustrative operative embodiment of the present invention is shown in the accompanying drawings wherein:

Figs. 3 and 6 represent positions occupied successively by the pair of antennas shown in Fig 1;

Figs. 4 and 5 are geometrical diagrams applied to the pair of antennas shown in Fig. 1;

Figure 1:
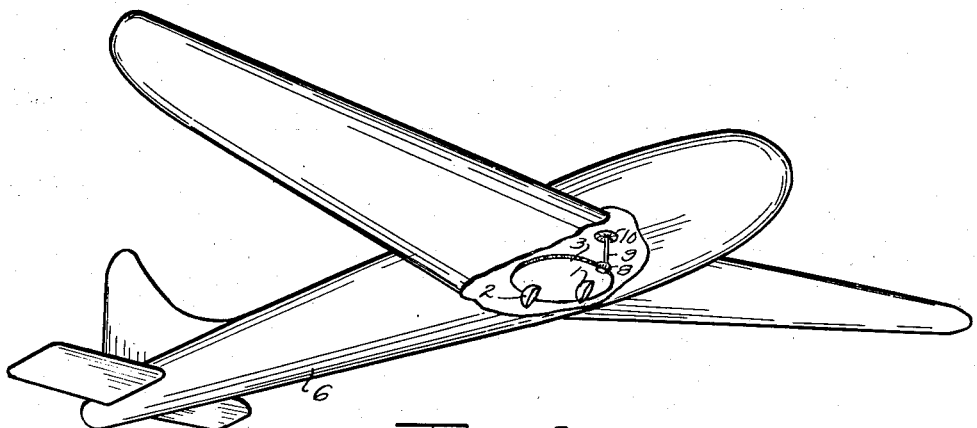
Fig. 1 is a fragmentary and broken away view from below of an aircraft with a pair of antennas adjustably mounted for hand operation on a rotatable platform beneath the fuselage of the aircraft.
Figure 2:
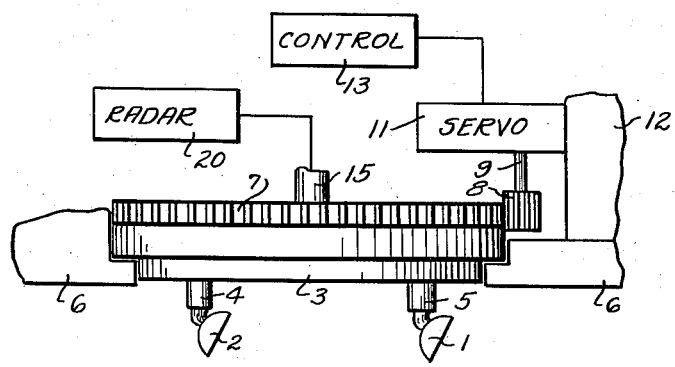
Fig. 2 is an enlarged fragmentary and diagrammatical side elevation of the antenna platform shown in Fig. 1 adapted for servo control.

The provision of an airbourne radar antenna array adapted for use in the present invention and shown in Figs. 1 and 2 of the accompanying drawings comprises antennas 1 and 2 rotatably mounted on a rotatable platform 3 and with provision such as a rack and pinion, antenna carrying sliding members secured by locking nuts, or the like, not shown, for adjusting the spacing between the antennas. The antennas 1 and 2 as nearly as possible are duplicates of each other with like patterns and are supported for scanning on the mounts 4 and 5. The platform 3 is mounted for rotation with respect to the fuselage 6 of the aircraft with roller bearings or the like, not shown, therebetween. The assemblage is not limited in scope to airbourne equipment and broadly contemplates a moving pair of radar antennas wherever they are used. The rotatable platform 3 is provided with a ring gear 7 that is engaged by a pinion gear 8 operated by a shaft 9. The shaft 9 is operated from either a hand wheel 10 in Fig. 1 or from a servo 11 in Fig. 2. The servo 11 is shown mounted upon a rigid support 12 and is operated from a common form of control 13. Suitable wave guide means 15 conduct transmitted signal and returned echoes between the antennas 1 and 2 and the radar 20.

The antennas 1 and 2 are located at the same point in space during successive transmissions of radiated pulses therefrom. In accomplishing this result one antenna is located forward of the second antenna in the direction of the motion of the airplane. Both antennas move forward due to the motion of the airplane. In a period equal to one pulse repetition time the second or aft antenna will be moved forward to the position previously occupied by the first or fore antenna so that the second antenna emits its pulse from the location in space from which the first antenna emitted its pulse.

The echoes resulting from the pulse transmission from the first antenna are stored in radar 20 and are compared in such a way with the echoes that result from a second transmission and that are received in the radar 20 from the second antenna so that the presentation shows the difference between the echoes received on the two transmissions. For an arbitrary maximum range of 15 miles for the disclosed equipment 15 miles of range would be stored in the storage system within the radar 20. The transmissions from the two antennas are made at the same frequency. In the moving target indicator adaptation of the present invention fixed echoes are cancelled while echoes from moving targets in combination with ground clutter vary in amplitude from pulse to pulse and will not cancel but are amplified and appear on the P.P.I. tube in the radar 20.

If preferred in the circuit of such a system two magnetrons, not shown, operating at the same frequency may be used with one modulator which alternately pulses the two magnetrons. Each magnetron is coupled to its own antenna so that alternate transmissions are made from the two antennas. After the comparison of the echoes from two transmissions the storage system is erased and the process is repeated.

In Fig. 3 of the accompanying drawings, D indicates the distance separating the fore and aft antennas 1 and 2, respectively. Zero indicates the position at which the forward antenna is located when emitting a pulse indicated by a numbered arrow. X indicates the position of the aft antenna. The position X of the aft antenna is superimposed upon the position zero of the forward antenna at the time the aft antenna transmits its pulse indicated by the second numbered arrow. In Fig. 3 the odd numbered arrows represent successive transmissions from the forward antenna and the even numbered arrows represent successive transmissions from the aft antennas. The antennas also are scanning. In order to set up the conditions desired it is necessary to consider the ground speed of the aircraft, the repetition pulse rate and the distance separating the two antennas. In addition, the center line of the two antennas must be parallel to the direction of the vector motion of the airplane. Sector scanning is possible within limits of the separation of the two antennas and the size of their reflectors.

As an illustrative example of a determination of the distance between the antennas, let it be assumed that the pulse repetition frequency is 200 pulses per second. For a pulse repetition of 200, alternate transmissions from the two antennas, 100 pulses per second are transmitted from each of the two antennas. If it is assumed further that the speed of the airplane is 400 miles per hour then the distance between the two antennas will be 2.9 feet. The repetition time is equal to $\frac{1}{200}$ second or 5000 microseconds. The airplane moves $$400 \times \frac{5280}{3600}$$

or 587 feet per second. In one repetition time therefore the airplane moves $$\frac{5000}{10^6} \times 587 = 2.9 \text{ feet}$$

In this example, level flight is contemplated and therefore the desired conditions are obtained when the antennas are positioned in line parallel to the ground tract and are separated 2.9 feet with the repetition rate 200 pulses per second and the airplane flying at 400 miles per hour.

Figure 4:
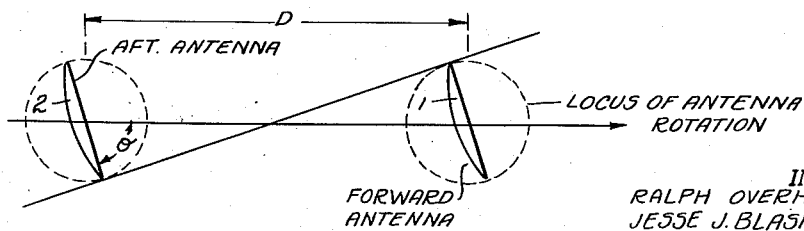

In Fig. 4 of the accompanying drawings is shown a geometrical figure used in estimating the angle which can be sector scanned under the assumed conditions. In Fig. 4, both antennas can be rotated through an angle $\theta°$ either side of the direction or beam at right angles to the direction of motion of the aircraft before one antenna physically interferes with the transmission and reception by the other antenna. If a tangent to the circles of rotation of the two antennas is drawn as shown, the value of $\theta$ is found to be $31\frac{1}{2}°$ since $$\theta = \cos^{-1} \frac{15''}{\frac{2.9 \times 12}{2}} = \cos^{-1} .852 = 31.5°$$

$2\theta = 63° =$ sector which can be scanned on either or both sides of the airplane.

An approximation to the angular velocity of the antenna rotation can be obtained by assuming a number 7 for the number of hits on small targets such as an automobile as being sufficient for detection. At X band the beam width obtained with 30'' parabolic reflectors is approximately 3°. Then $360/3 = 120$ transmissions required on each revolution for complete coverage with one transmission per beam width.

$120 \times 5,000$ microsecond $= 600,000$ microseconds per revolution.

$$\frac{10^6}{600,000} = 1.66 \text{ rev./sec.} = 100 \text{ revolutions per minute.}$$

For 7 hits the rotation is $\frac{1}{7} \times 100$ or 14.3 revolutions per minute.

In Fig. 5 the platform 3 is adjusted so that the center line of both antennas coincides with the vector direction of the ground velocity. The distance between the antennas is established. The pulse repetition rate is adjusted so that the plane travels through the distance between the antennas during one pulse repetition time. Both antennas are scanning as indicated by the curved arrows. Since the second or aft antenna has to radiate in the same direction as the first or forward antenna after the pulse repetition time the beam axis of the second antenna lags behind the beam axis of the first antenna by an angle alpha through which it turns during one pulse repetition period.

The angle alpha is the angle turned through in one repetition time and is the angle by which the aft antenna must lag behind the forward antenna at any instant in their rotation. Under the assumed conditions $$\text{alpha} = \frac{5000}{10^6} \times \frac{14.3 \times 360}{60} = .43°$$

A cancellation unit capable of operating with an adjustable repetition rate is an advantage in this system in that it is then possible to vary the repetition rate used to correspond to that required by the speed of the airplane and by the antenna separation. The faster the speed of the airplane the higher the repetition rate which can be used. A high repetition rate is advantageous since it provides more hits on a target. In the event that the speed of the airplane in the example given is increased from 400 miles per hour to 600 miles per hour then the repetition rate is increased from 200 pulses per second to 300 pulses per second. It also would be possible to retain the same repetition rate of 200 pulses per second and increase the antenna separation to $$2.9 \times \frac{3}{2} = 4.4 \text{ feet}$$

and so increase the sector scan angle. $\theta$ then would be that angle whose cosine is $$\frac{15''}{\frac{4.4 \times 12}{2}} = \cos^{-1} .59 = 59.5° \text{ or } 2\theta = 119°$$

Some of the advantages of the present system are that fluctuations in the ground return from pulse to pulse due to the motion of the airplane, scanning, beam and pulse widths are negligible because the successive pulses are transmitted from the same point in space and in the same manner, hence equal signals are returned from the ground. This system is adaptable to high speed aircraft. In addition, the direction of the ground track and the ground speed of the airplane can be obtained. The direction of the ground track is obtained by noting the direction of the center line of the antennas when the best cancellation is obtained. Ground speed is obtained by noting the repetition rate for best cancellation and multiplying the distance between centers of the antennas by this value. For example 200 pulses per second×2.9 feet separation gives 580 feet per second ground speed of the airplane.

In Fig. 6 of the accompanying drawings another type of transmission allows a faster repetition rate to be used. The symbols used in Fig. 6 substantially conform with those used in Fig. 3 with the exception that in Fig. 6, A is the distance the airplane covers in one repetition time and B is the distance the airplane moves during the storage time and also equals the distance between the antennas.

As an example of this latter type of operation a pulse repetition frequency of 1200 pulses per second are made in groups of 6 successive pulses from each antenna at a repetition time of $$\frac{10^6}{1200} = 833.3 \text{ microseconds}$$

With the speed of the airplane the same as before, 400 miles per hour and the antenna separation again 2.9 feet and the storage time 5000 microseconds, then in one storage time the airplane moves $$\frac{5000}{10^6} \times 587 = 2.9 \text{ feet}$$

In this example a series of 6 successive transmissions and receptions at a series of positions are made from the forward antenna. The echoes received from these transmissions are stored for a period of 5000 microseconds or 6 times a repetition time.

The next group of 6 successive transmissions and reception are made from the aft antenna. The echoes received from these transmissions from the aft antenna are compared undelayed with the stored signal received by the first antenna and the process is repeated. An illustrative storage may be a mercury delay line or a series of mercury delay lines with associated amplifiers. The pulse recurrence frequency of this latter system could be as high as desired consistent with the range it is desired to operate over. The separation of the antennas for a particular speed depends upon the storage time. If longer storage times could be used then the antennas could be separated further than in the assumed examples. Otherwise for longer storage times the speed of the airplane is reduced.

The described radar system provides information about the ground speed and drift of the airplane. For an optimum cancellation of the ground return the aft antenna must radiate its pulse at the place where the first antenna was when the first antenna radiated its pulse. The repetition time of the pulses is adjusted therefor to a value which is determined by the speed of the airplane. After adjusting the repetition time $t_1$ for optimum cancellation, the speed $v$ of the aircraft can be calculated by means of the formula $$v = \frac{d}{t_1}$$

where $d$ is the distance between the two antennas. With a constant repetition rate the distance between the center of the antennas is adjusted for optimum cancellation and the same calculations as before are used for obtaining ground speed.

Figure 7:
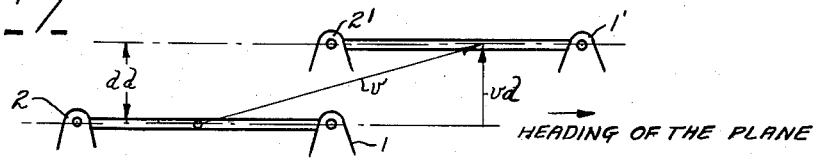
Figs. 7 and 8 are ground velocity vector diagrams applied to the pair of antennas shown in Fig. 1.
Figure 8:
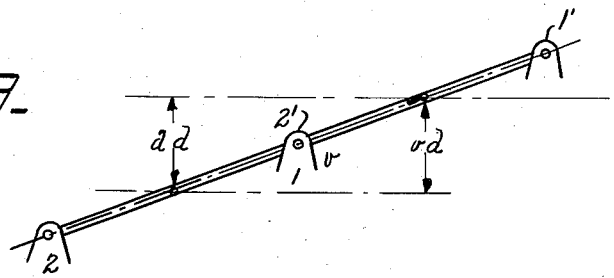

In general, the wind causes a drift of the aircraft so that the two antennas 1 and 2 which are in line with the axis of the aircraft are displaced to the primed position 1' and 2', as shown in Figs. 7 and 8. The ground velocity vector of the aircraft is represented by the arrow $v$. The arrow $v$ has one component drift velocity $v_d$ perpendicular to the axis of the aircraft. The lateral displacement $d_d$ relative to the heading of the airplane of the second or aft antenna with respect to the previous location of the forward antenna is $d_d = v_d \times t_1$. As long as the center line of the two antennas is parallel to the plane's axis the cancellation will be as poor as when a normal single antenna aircraft moving target detector radar system which moves at the low drift speed $v_d$ is used. This limitation requires a directional adjustment of the center line of the two antennas to make it parallel to the ground velocity vector shown in Fig. 8. After the repetition time $t_1$, the aft or second antenna now occupies exactly the place of the fore or first antenna with respect to the ground.

In order to perform this adjustment the antennas may be mounted on a turn table or one antenna may be adapted for being moved sideways. Therefore the optimal cancellation requires two adjustments in possibly several steps alternating between the following two steps: (1) the adjustment of the relation between the repetition time, the speed and the distance between the two antennas, according to equation $$v = \frac{d}{t_1}$$

by adjusting one of these quantities such as the repetition time; and (2) the adjustment of the direction of the center line of the two antennas. After this operation is completed, the position of the two antennas and the repetition time permits the determination of the ground speed and the drift angle of the aircraft.

Figure 9:
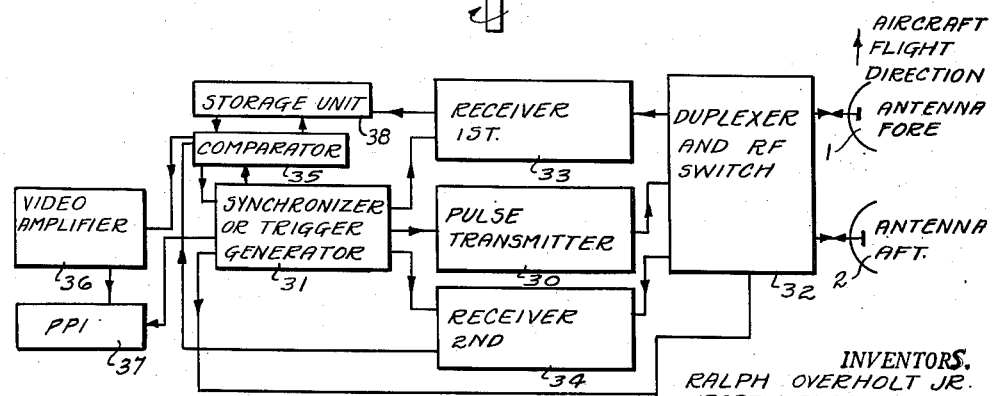
Fig. 9 is a block diagram of a representative modified radar circuit used with a pair of antennas shown in Fig. 1.

In Fig. 9 of the accompanying drawings is shown a block diagram of a modified radar system indicated in Fig. 2 as the radar 20. The system in Fig. 9 is a two antenna airbourne moving target indicator system embodying the present invention. In this circuit shown a radar pulse originates in a transmitter 30. Transmissions from the pulse transmitter 30 are controlled by a synchronizer or trigger generator 31, which establishes repetition rate as required for optimum cancellation; or if a fixed storage time is used the synchronizer establishes a repetition rate required by this fixed storage time. The synchronizer or trigger generator 31 illustratively contains a bistable multivibrator such as that disclosed in Fig. 5.4 on page 164 of volume 19 (1949), Radiation Laboratory Series, with output from the plate of tube $V_2$ passed to the input terminal in Fig. 2.35 (a) on page 105 of volume 18 (1948), Radiation Laboratory Series, where push-pull outputs from both the tube plate and the tube cathode go separately to the first receiver 33 and to the second receiver 34 of the drawings herewith, such that these receivers 33 and 34 are alternately gated. The synchronizer 31 is connected through a duplexer and switching unit 32 to the antennas 1 and 2. The duplexer and switching unit 32 also is controlled by the synchronizer 31 so that the antennas 1 and 2 will radiate pulses alternately. Echo signals returned to and intercepted by the antennas 1 and 2 are passed by the duplexer and radio frequency switch 32 to both the receivers 33 and 34. The receivers 33 and 34 are controlled by the synchronizer 31 so that they receive and pass signal alternately. A synchronizing signal is fed from the synchronizer or trigger generator 31 into the comparator 35 and then into the storage unit 36 where it is delayed in time and is reamplified and is fed back through the comparator into the synchronizer or trigger generator 31 as a trigger signal. This action is repeated continuously. When the first receiver 33 is effective for one pulse period it feeds a first signal into a storage unit 38. In the next pulse period the second receiver 34 is effective and feeds signal to a comparator 35 as simultaneously the first stored signal is released and is subtracted from the second signal in the comparator 35 so that only the difference of the two successive signals will arrive at the video amplifier 36, for presentation of a P.P.I. tube 37 on the screen of which they appear as a presentation of the returns from moving targets only. The comparator 35 is coupled with the synchronizer or trigger generator 31 through a servo loop indicated by a pair of short lines bearing arrows of opposite direction between the comparator 35 and the trigger generator 31. This circuitry maintains a proper repetition rate for the system.

When the transmitter 30 is passing signal through the duplexer and radio frequency switch 32 for transmission from the fore antenna 1, the second receiver 34 is switched off. The echo from this first signal is received by the fore antenna 1 and is switched through the duplexer and radio frequency switch 32 and through the first receiver 33 to be stored in the storage unit 38.

Figure 10:
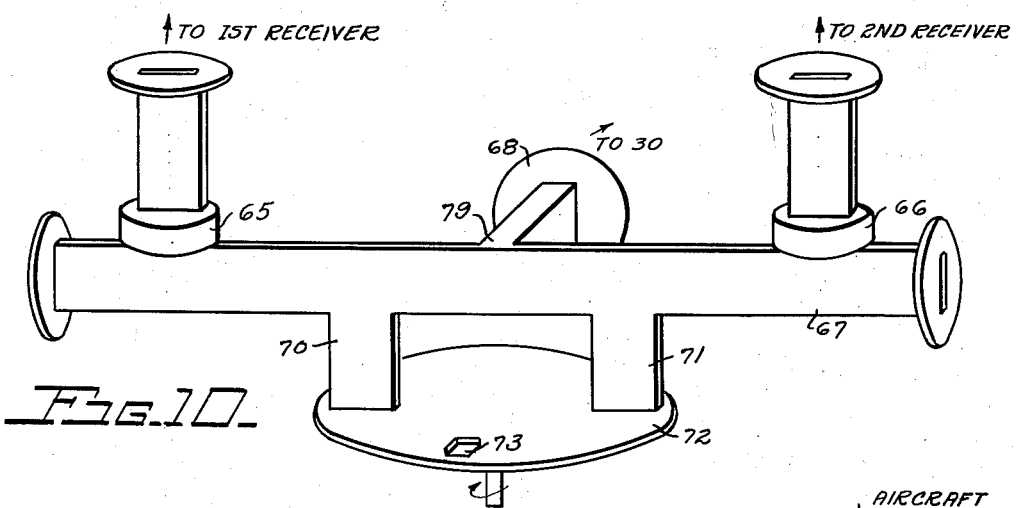
Fig. 10 is a perspective view of a mechanical duplexer and switch part of the circuit shown in Fig. 9.

The next following transmission from the transmitter 30 takes place from the aft antenna 2 with the first receiver 33 switched off. The echo from this second signal is intercepted by the aft antenna 2, is switched through the duplexer and radio frequency switch 32 and through the second receiver 34 from which it is passed to the comparator 35 where it is compared with the stored echo from the first signal that has been stored or delayed in the storage unit 38. The resultant output from the comparator 35 is the total echo signal from which has been cancelled the return from fixed targets and this resultant moving target indicator signal is amplified at the amplifier 36 and is presented on the screen of the plan position indicator tube face of the P.P.I. unit 37. The duplexer and switch unit 32 in Fig. 9 is represented as a mechanical unit in Fig. 10. The duplexer and switching unit shown in Fig. 10 comprises a mechanical antitransmitter relay switch wherein two transmitter receiver tubes 65 and 66 are mounted on an interconnecting wave guide 67 and are two and one-half wave lengths apart. A suitable pulse transmitting fitting 68 connects the transmitter 30 to the center of the wave guide 67 through a guide stub 79. Two open guide stubs 70 and 71 extend from the guide 67 at a distance of one-half wave length on either side of the center of the wave guide 67. Each of the open stubs 70 and 71 is one-half wave length long. During most of the time the open ends of the wave guide stubs 70 and 71 are short circuited by a rotating conductive disc 72, thus received signals entering either end of the wave guide 67 are directed toward the receivers 33 and 34 and are prevented from traveling to the pulse transmitter 30 through the wave guide 79. When the disk window 73 is in registration with stub 70, a pulse originating at the transmitter 30 is conducted by the stub 79 and the wave guide 67 to the antenna 1. When the disc window 73 is in registration with stub 71 energy is conducted to antenna 2.

The first pulse signal originates in the pulse transmitter 30 and is directed by the duplexer 32 to the antenna 1. Echoes received from the first transmission are picked up by both antennas 1 and 2 and are directed to the receivers 33 and 34 respectively by the duplexer 32. Receiver 34 however, is gated inoperative during this reception. Output from the receiver 33 is stored in the storage system 35. The second pulse transmission originates in the pulse transmitter 30 and is directed by the duplexer 32 to the antenna 2.

The echoes received by the two antennas are again passed to both receivers 33 and 34 but this time the receiver 33 is gated inoperative and the output of the receiver 34 is passed to the storage unit 35 which compares it in a subtraction circuit with corresponding echoes stored from the first pulse transmission. The output of the storage system 35 is passed to the video amplifier 36 for presentation on the P.P.I. tube 37. The synchronizer 31 controls the rotation of the disc 72 in the duplexer 32 and establishes the trigger action for the pulse transmitter 30, the storage unit 35 and the P.P.I. tube 37. The transmit receive tubes 65 and 66 are provided to keep the high energy of the transmitted pulse from reaching the crystals in the receivers 33 and 34.

In the practice of the moving target indicating system only moving targets appear on the plan position indicator scope. This is accomplished by pulse to pulse cancellation. Signals from a first sweep are delayed for a whole repetition period and are then subtracted from the signals of a second sweep. Stationary targets exhibit constant echo amplitude from pulse to pulse whereas a moving target in combination with a stationary target is characterized by variations in the combined echo amplitude. Pulse to pulse cancellation by subtraction of successive sweeps removes from the presentation stationary target echoes of like range and amplitude and presents moving target echoes of unlike amplitude. The present invention is applicable to any radar system and its use is not limited to MTI practices. Moving target indication circuitry appears in Chapter 16 of "Radar System Engineering" by Lewis N. Ridenour, vol. 1, published in 1947 by McGraw-Hill Book Co. Inc. In this cited publication on page 634 appears a representative target generator 31 in Fig. 16.12 and a representative comparator 35 in Fig. 16.11.

The scope of the present invention is such that the pair of antennas disclosed herein are applicable to any moving device where an advantage is derived from more than one transmission from a fixed point in space with the successive transmissions separated by a predetermined time interval. The scope of the present invention is such that the pair of antennas disclosed herein may be caused to occupy a common or the same position in space at the instant of radiation by means other than those shown herein since no such provision for antennas radiating at time intervals from a fixed point in space and carried by a moving vehicle is believed to have been perfected heretofore.

It is to be understood that the construction and the operation of the two antennas on their platform and the disclosed circuitry inclusive of components and parts associated therewith have been submitted for the purposes of illustrating and describing an operative embodiment of the present invention and that similarly functioning modifications thereof and substitutes therefor may be made without departing from the scope of the present invention.

What we claim is:

1. An airborne radar system for moving target indication, comprising fore and aft antennas mounted a known distance apart on an airplane, means for generating periodically repeating pulses of electrical energy, means for applying the pulsed energy at time intervals to said fore and aft antennas for radiation of the pulsed energy, means for receiving reflected energy from the radiation of said fore antenna, means for storing the reflected energy received by said fore antenna as a result of its radiation, means for receiving reflected energy from the radiation of said aft antenna, means for comparing with said stored energy the reflected energy received by said aft antenna as a result of its radiation, a signal presentation means, said time intervals being equal to the time required for the airplane to travel in the direction of its ground velocity a distance equal to the distance between said antennas, means for adjusting the position of said antennas relative to said airplane to produce a parallel relationship between a line through the centers of said antennas and the direction of the ground velocity of the airplane whereby said aft antenna during its transmission occupies the same position in space that was occupied by said fore antenna during its transmission with the result that reflected signals from fixed objects on the ground cancel in said comparing means and moving objects on the ground appear on said signal presentation means.

2. An airborne radar system for moving target indication, comprising fore and aft antennas mounted a known distance apart on an airplane, means for generating periodically repeating pulses of electrical energy, means for applying the pulsed energy to said fore and aft antennas for radiation of the pulsed energy, means for receiving reflected energy from the radiations of said fore antenna, means for storing the reflected energy received by said fore antenna as a result of its radiation, means for receiving by the aft antenna reflected energy from the radiation of said aft antenna, means for comparing with said stored energy the reflected energy received by said aft antenna as a result of its radiation, signal presentation means, means for adjusting the repetition frequency of said pulses to such a value that the time between pulses equals the time required for the airplane to travel in the direction of its ground velocity a distance equal to the distance between said antennas, and means for adjusting the position of said antennas relative to said airplane to produce a parallel relationship between a line through the centers of said antennas and the direction of the ground velocity of the airplane whereby said aft antenna during its transmission occupies the same position in space that was occupied by said fore antenna during its transmission with the result that the reflected signals from fixed objects on the ground cancel in said comparing means and moving objects on the ground appear on said signal presentation means.

References Cited in the file of this patent

UNITED STATES PATENTS

| | | |
|---|---|---|
| 2,422,064 | Anderson et al. | June 10, 1947 |
| 2,426,183 | Deloraine et al. | Aug. 26, 1947 |
| 2,426,228 | Mackta | Aug. 26, 1947 |
| 2,455,639 | Anderson | Dec. 7, 1948 |
| 2,491,450 | Holmes | Dec. 13, 1949 |
| 2,523,283 | Dickson | Sept. 26, 1950 |
| 2,523,398 | Southworth | Sept. 26, 1950 |